Oct. 27, 1959 J. SHAW 2,910,168
APPARATUS FOR TRANSFER OF DENSE SOLID MATERIALS
Filed June 21, 1956
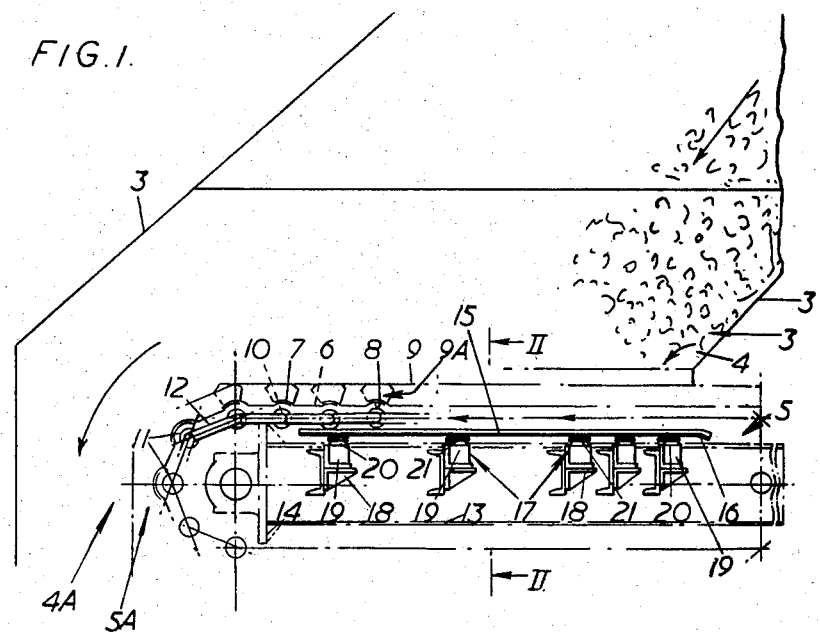
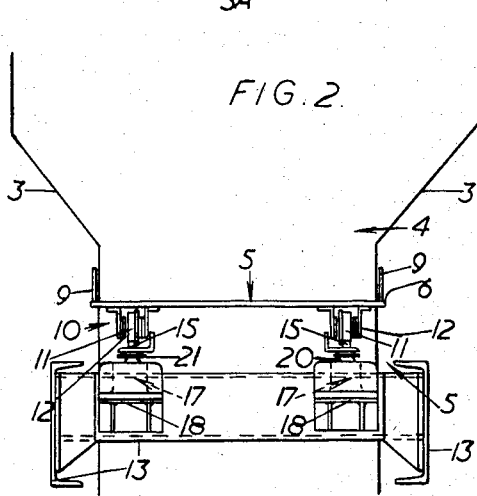
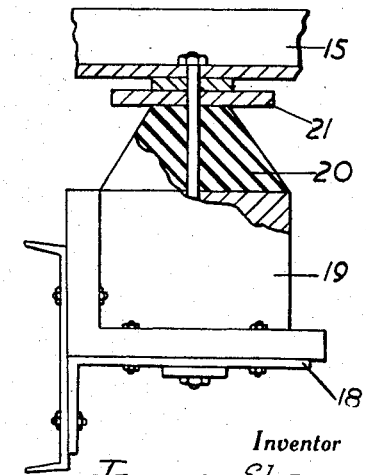
Inventor
James Shaw
By
Gustav H. (illegible) Attorney

United States Patent Office 2,910,168
Patented Oct. 27, 1959

2,910,168

APPARATUS FOR TRANSFER OF DENSE SOLID MATERIALS

James Shaw, East Kilbride, Scotland, assignor to Keir and Cawder Limited, Glasgow, Scotland Application June 21, 1956, Serial No. 592,913

4 Claims. (Cl. 198—57)

This invention relates to apparatus for transfer of dense solid materials.

It is known in this type of apparatus to load dense solid materials, such as stones or ore or coal, often as large lumps, on to conveyors after tipping out of a truck or wagon. Relatively large lumps of the solid may be involved and as these drop downwards there is often a surge in the feed with great shocks on the receiving conveyor. For example, the drop may be as much as twenty-five feet, and in many cases a lump may weigh a ton or a ton and a half. Hence it is necessary to make the conveyor and associated parts of very robust construction to withstand the shocks. Thus, the conveyor parts must be not only strong, for example of relatively expensive manganese steel, but relatively thick; they are thus expensive to make and to drive.

The present invention is apparatus for transfer of dense solid materials, comprising in combination, a hopper (or chute) adapted to deliver the solid material downwardly through the hopper mouth to a loading point, a conveyor movable relative to the hopper mouth at the loading point, guide means for the conveyor during its movement at the loading point, and means for resiliently supporting said guide means so as to cushion the conveyor against shocks.

The present invention further is apparatus for delivery of dense solid materials, comprising a hopper (or chute) having its outlet offset from its inlet, and a resiliently mounted endless band conveyor located partly across said outlet so that the fall of material from the inlet is broken by the conveyor whose upper run is adapted to carry the material to the remaining opening at the outlet.

Preferably, the conveyor is of the endless band type, and the band comprises a series of articulated rigid plates, and is movable on wheels on rails, the rails being supported by resilient elements, for example, rubber buffers. Springs, for example, coil springs, may be used, but on the whole rubber buffers are preferred because they can allow a measure of lateral or horizontal deflection resiliently, as well as the normal vertical shock-absorbing deflection.

The resilient elements may be positioned non-uniformly below the guide rails so as to provide the maximum support at any part of the conveyor where the shocks tend to be concentrated.

The present invention further is an endless conveyor, guide means for the conveyor, means for resiliently supporting said guide means so as to cushion the conveyor against shocks, and means for mounting the conveyor in position across part of the mouth of a hopper or chute for dense solid materials.

As a result of the invention the weight and cost of the conveyor may be substantially reduced, and likewise the cost of operating the conveyor is substantially reduced.

An embodiment of the invention will now be described, by way of example, with reference to the accompanying drawings, in which:

Fig. 1 is a diagrammatic side elevation of the hopper and conveyor,

Fig. 2 is a section on the line II—II of Fig. 1, and

Fig. 3 is a part sectional side elevation of a shock absorber.

The hopper (or chute) 3 has parallel ends but is inclined downwardly at an angle of about 45° to the vertical. Its lower end 4 is open and forms a mouth situated above a horizontal endless conveyor 5, the discharge ends 5A of the conveyor being somewhat short of the hopper wall in order to leave a passage 4A, through which the material is fed or transferred to a main conveyor belt (or other collector). The mouth of the hopper is tapered laterally to a short distance within the width of the conveyor 5.

The conveyor 5 comprises a series of horizontal plates 6 extending laterally across the conveyor, each plate at leading and trailing ends having curved parts 7 and 8 which overlie and underlie, respectively, so that no openings are left and the plates can pivot relatively to each other around the conveyor frame.

Each plate has an upstanding wall 9 at each side, and the two walls of adjacent plates likewise overlap each other at 9A, thereby forming a conveyor of channel shape.

The conveyor plates 6 are mounted on the axles 10 of flanged chain rollers 11. A series of these rollers on each side of the conveyor are articulated together by links 12, and the whole conveyor works in endless fashion on a stationary frame 13. Tension may be applied to the conveyor plates, for example, through resiliently mounted pulleys 14.

The chain rollers 11 run on two parallel rail lengths 15 extending below the hopper mouth 4, the rail lengths being curved downwardly at their ends 16 to form a run-in for the rollers.

Each rail length 15 is supported on a series of rubber cushions or shock absorbers 17 mounted on rigid brackets 18 on the frame. In this example, the shock absorbers comprise a steel base 19 with a rubber cone 20 above same, and a washer 21 above the cone. Vertical bolts extend from the rails 15 downwardly through the cones, the bolts being allowed vertical movement with vertical movement of the rubber cones 20.

In operation, as the surge of dense solid material drops downwardly through the hopper 3 it tends to concentrate on the upwardly facing inner surface of the sloping hopper, and may tumble almost vertically on to the conveyor 5. For this reason, in this example, the shock absorbers 17 are provided, for each rail, in greater numbers nearer the leading side 3A of the hopper; three below the conveyor at this part, one below approximately the middle of th hopper, and the other somewhat nearer the trailing side of the hopper and just before the rail lengths end. Obviously, the positions of the shock absorbers will be arranged in accordance with the requirements of each particular installation.

It will be evident that the conveyor 5 must stand the shock of stopping fall of the discharged material, and this shock may be great. Under this invention, a large proportion of the shock is taken up by deflection of the shock absorbers 17, and the upper surface of the conveyor thus becomes a floating platform.

Furthermore, the rubber shock absorbers referred to permit a certain degree of deflection in the horizontal sense as well as in the vertical sense, but limit the horizontal deflection.

The shock absorber may advantageously comprise a rubber cushion in which the rubber is in shear. Thus it may comprise a rubber cylinder with an inner or axial attachment for one of the moving parts, the exterior being encased in metal and attached to the other moving part.

I claim:

1. Apparatus for the transfer of dense particulate material, comprising in combination, a chute having a mouth at its lower point and adapted to deliver the particulate material downwardly to a loading point, an endless travelling conveyor movable relative to the chute mouth at the loading point, said conveyor comprising a series of articulated rigid units, a pair of floating short rail lengths on which said units slide, resilient mountings for said rail lengths comprising a plurality of rubber shock absorbers disposed at a plurality of locations along the length of the rails, and downward rigid extensions from the rail lengths projecting into said shock absorbers and acting to limit transverse or longitudinal movement of the rail lengths.

2. Apparatus for transfer of dense particulate material as claimed in claim 1, in which said rubber shock absorbers each comprise a rigid base, a resilient rubber cone above same, a washer above the cone, and at least one upright bolt extending from the rail downwardly through the cone, said bolt being allowed vertical movement with vertical movement of the resilient cone.

3. Apparatus for transfer of dense particulate material, comprising, in combination, a chute having a mouth at its lower part and adapted to deliver the particulate material downwardly to a loading point, an endless travelling conveyor movable relative to the chute at the loading point, said conveyor comprising a series of articulated plates each having at least one wheel thereon, and at least one resiliently mounted rail on which said wheel bears, resilient mounting means for supporting said rails comprising a plurality of resilient supporting elements for each rail disposed non-uniformly along the rail with a greater number per unit length at the loading point than at other points thus providing greater resilient support at the loading point than at other points, and locating means adapted to limit any transverse or longitudinal movement of the rail.

4. Apparatus for transfer of dense particulate material as claimed in claim 3, in which said resilient supporting elements each comprise a rigid base, a resilient cone above same, a washer above the cone, and at least one upright bolt extending from the rail downwardly through the cone, said bolt being allowed vertical movement with vertical movement of the resilient cone.

References Cited in the file of this patent

UNITED STATES PATENTS

| | | |
|---|---|---|
| 1,292,796 | Kaskoto | Jan. 28, 1919 |
| 1,430,621 | Bruhn | Oct. 3, 1922 |
| 2,239,076 | Biedess | Apr. 22, 1941 |
| 2,262,443 | Anderson | Nov. 11, 1941 |
| 2,689,637 | DeArmond | Sept. 21, 1954 |
| 2,769,515 | Thomas et al. | Nov. 6, 1956 |